US00RE38713E

(19) United States
(12) Reissued Patent
Habibi

(10) Patent Number: US RE38,713 E
(45) Date of Reissued Patent: Mar. 22, 2005

(54) HEATED HAIR STYLING SYSTEM

(76) Inventor: Masood Habibi, 9663 Santa Monica Blvd., #133, Beverly Hills, CA (US) 90210

(21) Appl. No.: 10/237,003

(22) Filed: Sep. 6, 2002

Related U.S. Patent Documents

Reissue of:
(64) Patent No.: 6,119,702
Issued: Sep. 19, 2000
Appl. No.: 09/258,604
Filed: Feb. 26, 1999

(51) Int. Cl.[7] ..... A45D 1/00; A45D 2/40
(52) U.S. Cl. ..... 132/224; 132/225; 132/118; 219/225
(58) Field of Search ..... 132/223, 224, 132/225, 229, 232, 269, 271, 272; 219/222, 225, 226, 230, 227, 231; 126/408, 409

(56) References Cited

U.S. PATENT DOCUMENTS

| | | | | |
|---|---|---|---|---|
| 1,465,838 A | * | 8/1923 | Caneavri | |
| 1,731,522 A | * | 10/1929 | Carlson | |
| 1,858,851 A | * | 5/1932 | Buchanan | 132/118 |
| 1,894,431 A | | 1/1933 | Vaghelatos | |
| 1,926,987 A | | 9/1933 | Durham et al. | |
| 1,957,049 A | | 5/1934 | Lakenbach | |
| 2,818,869 A | * | 1/1958 | Rose | 132/224 |
| 3,523,542 A | | 8/1970 | Eisler | 132/33 |
| 4,584,462 A | | 4/1986 | Morrison | 219/222 |
| 4,714,820 A | | 12/1987 | Morrison et al. | 219/222 |
| 4,739,151 A | * | 4/1988 | Smal | 219/225 |
| 4,911,186 A | | 3/1990 | Hayden | 132/246 |
| 5,263,501 A | * | 11/1993 | Maznik | 132/211 |
| 5,294,777 A | | 3/1994 | Denhup | 219/225 |
| 5,400,809 A | * | 3/1995 | Adams | 132/118 |
| 5,494,058 A | | 2/1996 | Chan | 132/228 |
| 5,513,665 A | | 5/1996 | Chan | 132/228 |
| 5,526,829 A | | 6/1996 | Smith | 132/229 |
| 5,566,688 A | | 10/1996 | Nakamura | 132/21.1 |
| 5,664,588 A | | 9/1997 | Berry | 132/232 |
| 5,694,954 A | | 12/1997 | Habibi | 132/211 |
| 5,799,671 A | | 9/1998 | Takimae | 132/225 |
| 5,890,496 A | | 4/1999 | Habibi | 132/210 |
| 5,934,293 A | * | 8/1999 | Kaizuka | 132/225 |
| 5,941,253 A | | 8/1999 | Kaizuka | 132/232 |
| 5,957,140 A | | 9/1999 | McGee | 132/224 |
| 5,983,903 A | | 11/1999 | Nanba et al. | 132/228 |
| 6,029,677 A | * | 2/2000 | Nanba et al. | 132/225 |
| 6,119,702 A | | 9/2000 | Habibi | 132/224 |
| 6,173,718 B1 | | 1/2001 | Okumoto et al. | 132/224 |
| 6,386,206 B2 | | 5/2002 | Lee | 132/225 |

* cited by examiner

*Primary Examiner*—Pedro Philogene
(74) *Attorney, Agent, or Firm*—Thelen Reid & Priest LLP; David B. Ritchie

(57) ABSTRACT

A hair styling apparatus includes a pair of mating surfaces which engage one another and a handle which guides them into engagement at the manual control of a user. Hair to be styled is placed between the engaged surfaces. A plurality of comb-like pins extend from one of the surfaces and engage holes in the other of the surfaces. In another aspect of the invention, one or both surfaces may incorporate a source of dry heat. In another aspect of the invention, a source of steam is provided together with a trigger for discharging the steam through holes in at least one of the surfaces as an aid to hair styling.

46 Claims, 7 Drawing Sheets

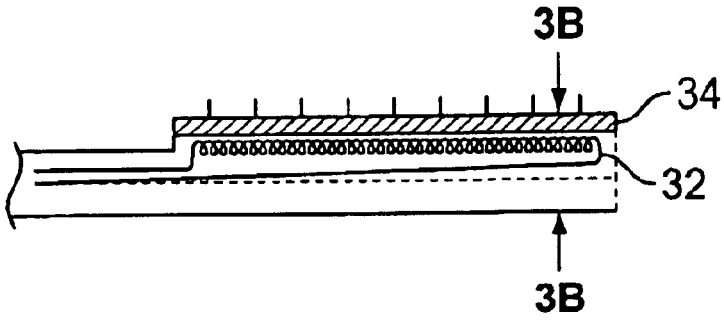
FIG. 3A
(Amended)

HEATED HAIR STYLING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to the field of hair care and styling. More particularly, the present invention relates to a hair styling system which incorporates a heating system so as to provide a new tool for styling hair.

2. The Background

Many devices have been devised over the ages to aid in styling hair. Hair curlers, for example, are used to impart curls into hair. They may be used on dry hair but work best on wet hair. Steam may be applied to assist in setting the hair to the curl of the curlers. Curling irons typically incorporate an electrical heating element to heat one or both sides of a smooth but curved pair of mating surface between which hair is placed to be curled. The hair may preferably be pulled through the interface of the mating surfaces of the curling iron to aid in curling the hair. On the other hand, hair straighteners operate much like curling irons, but they have smooth mating flat surfaces which act to straighten the hair when compressed against and pulled along the hair.

All known examples of such irons and straighteners comprise a pair of untextured surfaces for engaging the hair. As a result, the hair can become tangled, or require much additional combing or brushing with another apparatus such as a comb or brush in order to achieve the desired style. This additional combing and/or brushing can undesirably disrupt the style imparted by the irons and straighteners.

U.S. Pat. No. 5,263,501 to Maznik teaches a steam hair styling apparatus which utilizes a known steam source such as a Sunbeam valet steamer, model no. 10079, as a "steam engine" to provide steam to the center axis of a hair curler. The hair may be wrapped about the curler, the steam engine placed in the center of the curler and the steam source activated for a blast of steam departing radially through the curler from the steam engine. The steam aids in setting the curl in the hair. The patent teaches specifically that a secondary dry heat source should not be used in this application.

Accordingly, it would be desirable to provide a hair styling device capable of use in curling, straightening and/or waving hair which overcomes the limitations of the prior art.

SUMMARY OF THE INVENTION

A hair styling apparatus includes a pair of mating surfaces which engage one another and a handle which guides them into engagement at the manual control of a user. Hair to be styled is placed between the engaged surfaces. A plurality of comb-like pins extend from one of the surfaces and engage holes in the other of the surfaces. In another aspect of the invention, one or both surfaces may incorporate a source of dry heat. In another aspect of the invention, a source of steam is provided together with a trigger for discharging the steam through holes in at least one of the surfaces as an aid to hair styling.

BRIEF DESCRIPTION OF THE DRAWINGS

FIG. 3A is a cut-away cross-sectional drawing of a first surface of a hair styling apparatus in accordance with one embodiment of the present invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons after a perusal of the within disclosure.

Figure 1:
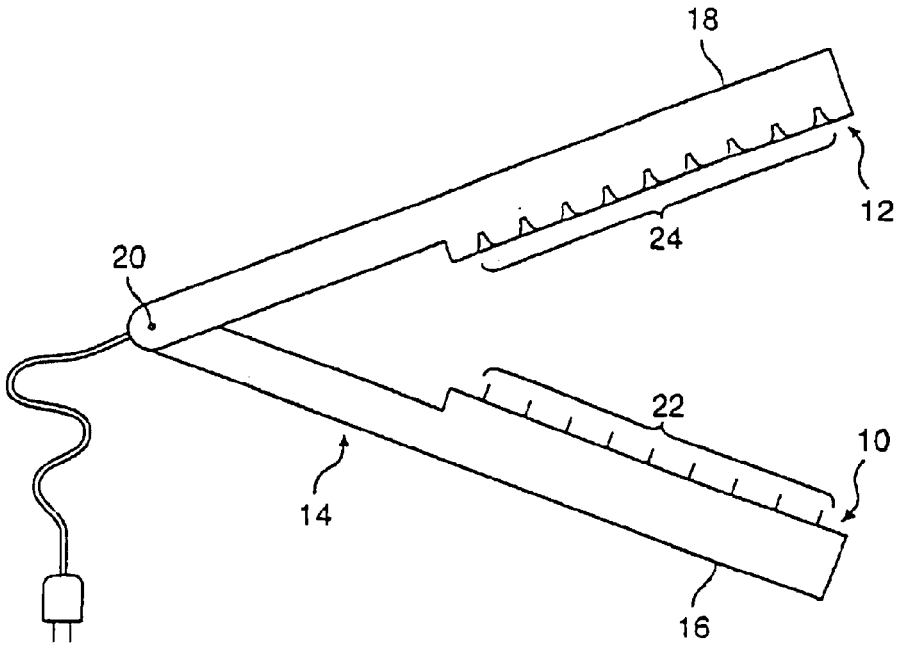
FIG. 1 is a side view of an apparatus for hair styling in accordance with a presently preferred embodiment of the present invention.
Figure 2:
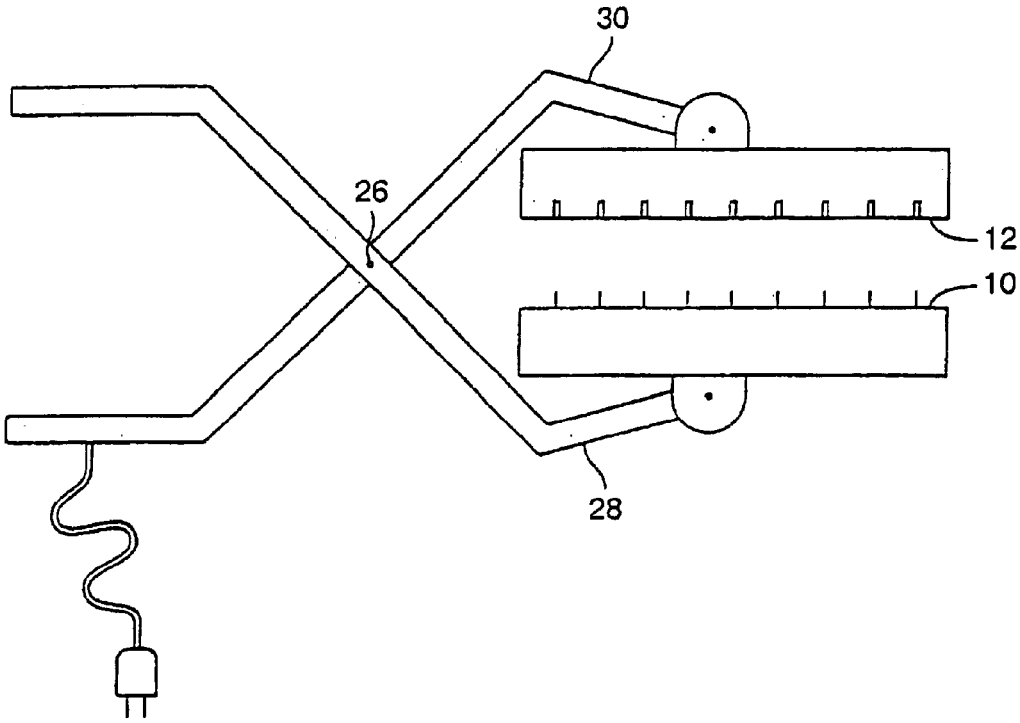
FIG. 2 is a side view of an apparatus for hair styling in accordance with an alternative preferred embodiment of the present invention.
Figure 3B:
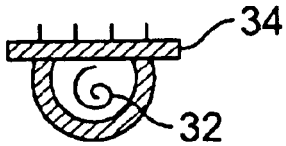
FIG. 3B is a cross-sectional drawing taken along lines 3B—3B of FIG. 3A.

In accordance with presently preferred embodiments of the present invention, a pair of surfaces are carried on a handle as shown generally in FIG. 1 and FIG. 2.

In the embodiment shown in FIG. 1 first surface 10 and second surface 12 are carried by handle structure 14 which includes a first portion 16 to which first surface 10 is attached and a second portion 18 to which second surface 12 is attached. First portion 16 and second portion 18 are mounted together at pivot point 20 and optionally biased toward an open position (as shown) as, for example, with a spring (not shown). An operator may press first portion 16 and second portion 18 together to engage first surface 10 and second surface 12 together in close conformance with hair to be styled disposed between first surface 10 and second surface 12. First surface 10 has a plurality of pins or tangs 22 disposed thereon as shown. Second surface 12 has a plurality of first holes 24 disposed thereon as shown. Pins 22 and holes 24 are formed so that pins 22 enter holes 24 when first surface 10 and second surface 12 are in close conformance when the apparatus is in the "closed" configuration.

Those of skill in the art will realize that the diameter, especially the entry diameter, of holes 24, the length and thickness of pins 22 and the length of first portion 16 and second portion 18 need to be coordinated so that pins 22 will engage holes 24. The precise arrangement will depend on the implementation but is straightforward. FIG. 2 shows an alternative embodiment where such coordination is less crucial. In the embodiment shown in FIG. 2 in addition to a pivot point as shown at 26, each surface 10 and 12 is pivoted to an arm portion, 28, 30, as shown. This arrangement provides an additional degree of freedom and therefore less clearance needs to be provided because it is then a simple matter to bias the surfaces 10, 12 so that they approach one another with little or no relative tilt, as shown.

Figure 4:
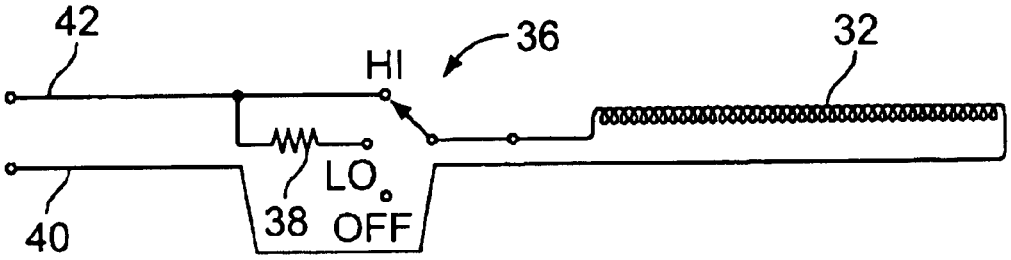
FIG. 4 is an electrical schematic diagram of a heating circuit for a heater for use in conjunction with a presently preferred embodiment of the present invention.

In accordance with one embodiment of the present invention, dry heat may be provided to one or both of surfaces 10, 12 by incorporating a conventional electrical heating coil 32 behind each respective surface. In this case it would be desirable to form the respective heated (and non-heated) surface of the temperature resistant materials 34, such as aluminum and high temperature plastics such as Teflon®. Where dry heat is provided, it is desirable to incorporate one or two electrical switches in handle 14 so as to control one or both electrical heating coils. A circuit for controlling one or two heating coils is shown in FIG. 4. A three position switch 36 is used to select high heat, low heat or off. A resistor 38 is used to provide a low heat setting. Conventional AC mains power may be provided to wires 40, 42 to power the circuit.

Figure 5:
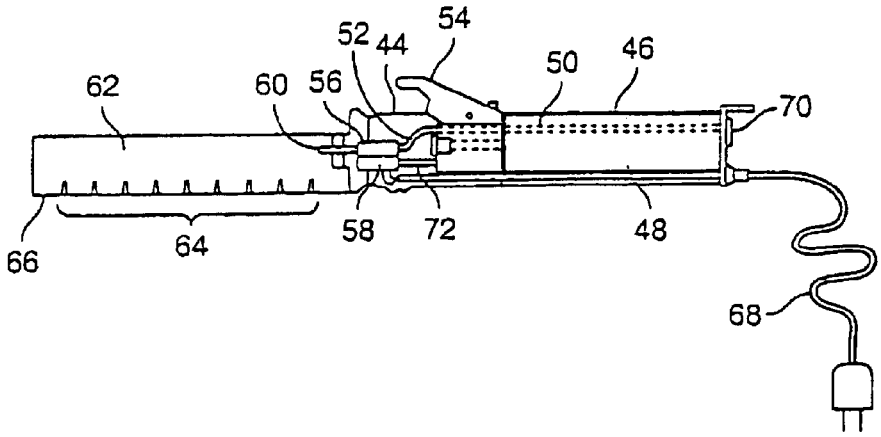
FIGS. 5 and 6 are cross-sectional and assembly drawings, respectively, of a fluid vaporization apparatus for use in an embodiment of the present invention.

In accordance with another embodiment of the present invention, steam heat is provided through holes in one of first surface 10 and second surface 12 (preferably through existing holes 24 in second surface 12). In accordance with this embodiment, portion 18 is modified as shown in FIGS. 5 and 6.

Figure 6:
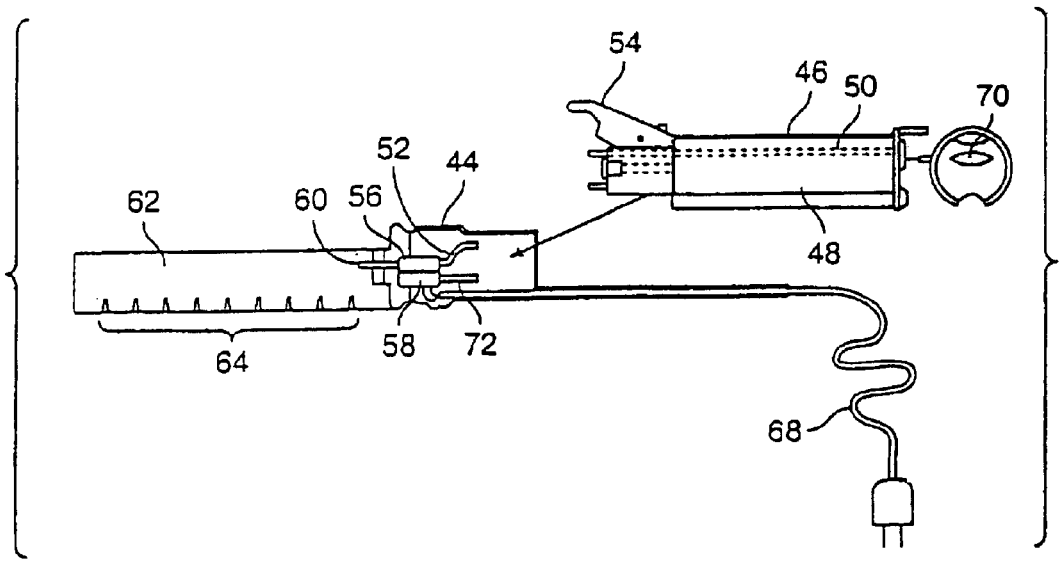

Housing 44 may contain a handle 46 which is detachable as shown in FIG. 6 or integrally attached thereto. Handle 46 contains a fluid reservoir 48 therein. A metered amount of fluid (such as water) is drawn through tubes 50 and 52 by activation of a pumping mechanism by trigger 54. Although fluid tube 50 is illustrated as being essentially linear it should be appreciated that the tube can be flexible, or semi-rigid and configured as is known in the art to effectively and efficiently withdraw fluid from reservoir 48. The fluid is passed across heat plate 56 which is heated by heating element 58. This heated fluid is therein atomized, exiting the steam emitting orifice 60 and into 62. This steam exits manifold 62 through a plurality of steam emitting holes 64 disposed about the lower surface 66 of manifold 62. Heating element 58 is supplied electrical current via cord and plug set 68. The apparatus further includes a fluid viewing window 70 at the end of reservoir 46 opposite the manifold 62. A return trough 72 and return tube are provided to return condensed fluid back to reservoir 48. Those of ordinary skill in the art will realize that other sources of steam can also be used.

Figure 7:
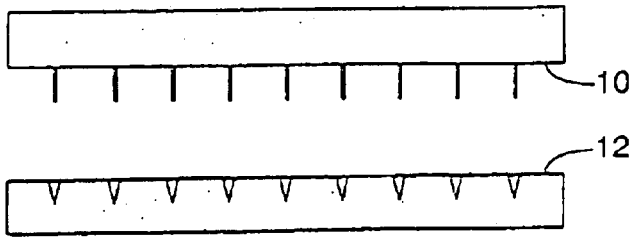
FIGS. 7, 8 and 9 are a side view, top view of first surface 10 and top view of second surface 12 in accordance with an embodiment of the present invention.
Figure 8:
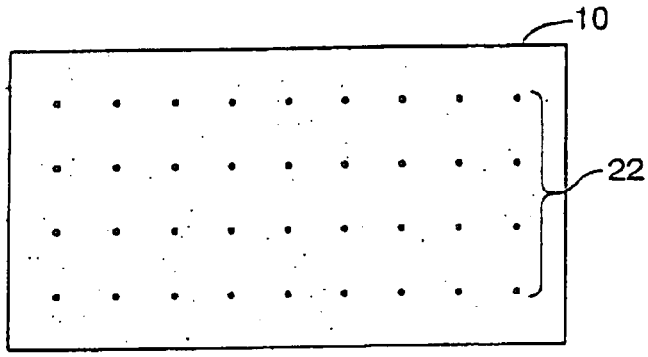
Figure 9:
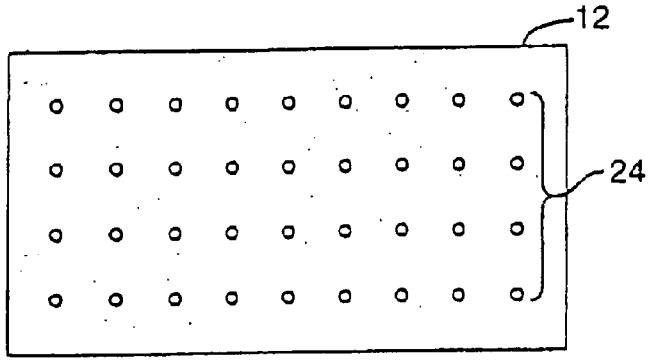

FIGS. 7, 8 and 9 show a side view, top view of first surface 10 and a top view of second surface 12, respectively. Any number of pins 22 and holes 24 can be used and any pattern can be implemented as would be apparent to those of ordinary skill in the art.

Figure 10:
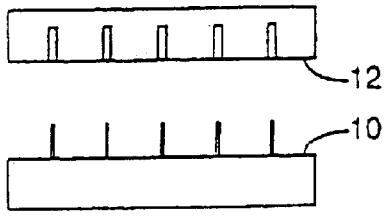
FIGS. 10–17 are front views of various configurations of mating surfaces 10 and 12 in accordance with various embodiments of the present invention.
Figure 11:
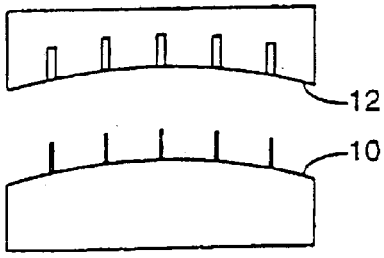
Figure 12:
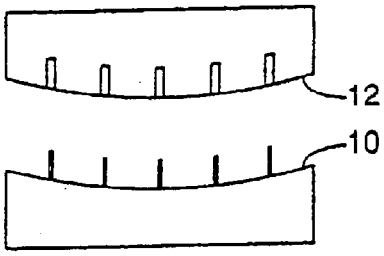
Figure 13:
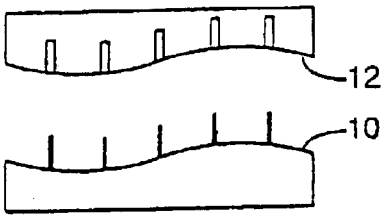
Figure 14:
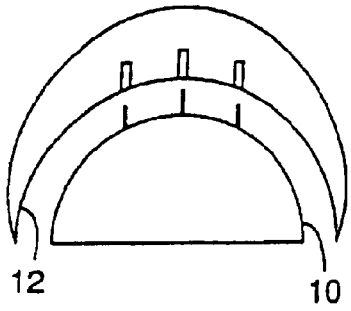
Figure 15:
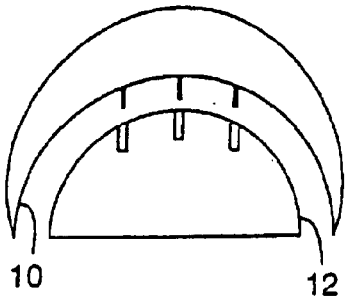
Figure 16:
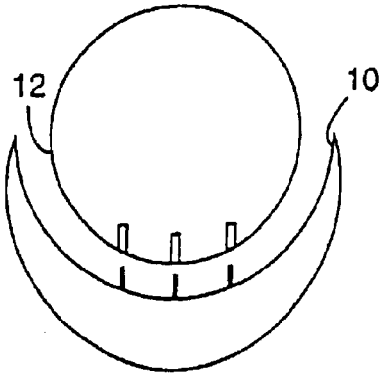
Figure 17:
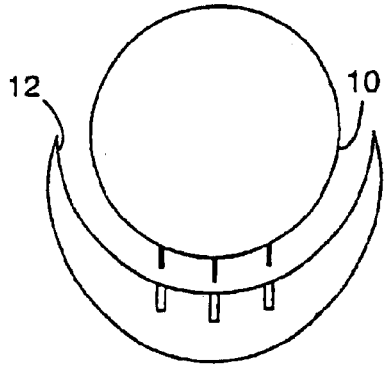
Figure 18:
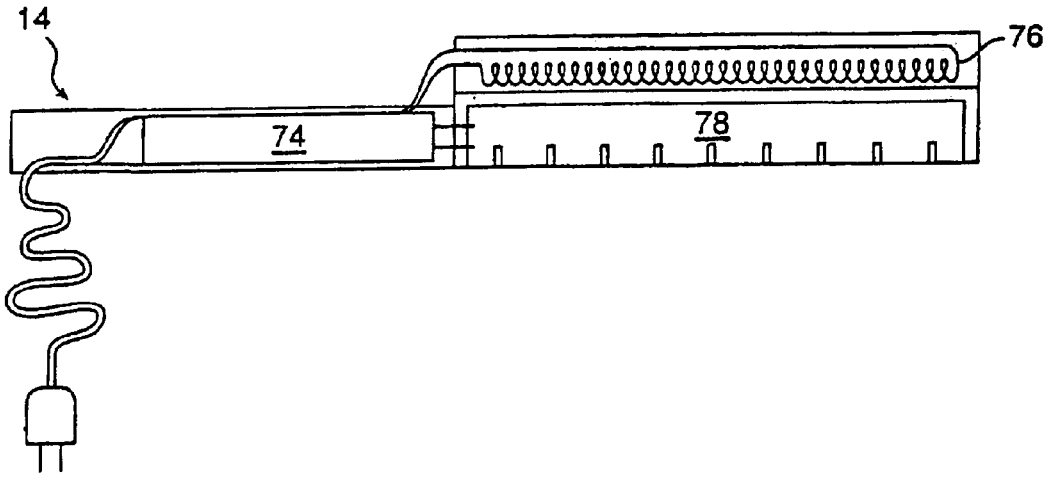
FIG. 18 is a cross-sectional drawing of another embodiment of the present invention.

FIGS. 10, 11, 12, 13, 14, 15, 16 and 17 show examples of various different patterns which may be imposed on mating surfaces 10, 12, in FIG. 10, a straight pattern is implemented as in a straightening iron. FIGS. 11, 12, 14, 16 and 17 show a curved pattern, both convex and concave, respectively, from the point of view of surface 10. FIG. 13 shows an "S" curve pattern for imparting a wavy style to the hair. In accordance with one embodiment of the present invention, various patterns of mating surfaces 10, 12 may be installed as options or interchangeable accessories in the apparatus of the invention. In this event, the surfaces would be removably mounted to respective heating elements and/or steam manifolds.

Where it is desirable to have dry heat and steam heat at the same surface, a configuration as shown in FIG. 18 may be used. In FIG. 18 steam engine 74 and electrical heater 76 are both mounted to one portion of handle structure 14. Steam manifold 76 is provided adjacent to heater 76 so that dry heat and steam may both be provided as desired. Surfaces in contact with the hair are preferably coated with Teflon® or a similar heatable non-stick material.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for styling hair, comprising:

a first surface including a plurality of pins extending therefrom;

a second surface including a plurality of first holes therein;

a handle, said first surface and said second surface mounted to said handle, said handle operable between an open position and a closed position;

said pins of said first surface and said first holes of said second surface arranged so as to engage when the handle is in said closed position;

a housing extending from said second surface and having an internal cavity;

a refillable reservoir for containing fluid;

a vapor generator within said internal cavity of said housing, said vapor generator heating the fluid to vaporization;

a pump activated by a trigger attached to said handle, said pump withdrawing a metered volume of fluid from said reservoir and placing said metered volume of fluid in contact with said vapor generator; and a passage connecting said vapor generator and second holes in said second surface so that vaporized fluid passes from said holes.

2. An apparatus according to claim 1 wherein said second holes in said second surface and said first holes in said second surface are the same.

3. An apparatus according to claim 1 further comprising a first heating element.

4. An apparatus according to claim 3 wherein said first heating element is disposed adjacent to said first surface so as to heat said first surface.

5. An apparatus according to claim 3 wherein said first heating element is disposed adjacent to said second surface so as to heat said second surface.

6. An apparatus according to claim 4 further comprising a second heating element disposed adjacent to said second surface so as to heat said second surface.

7. An apparatus according to claim 2 further comprising a first heating element.

8. An apparatus according to claim 7 wherein said first heating element is disposed adjacent to said first surface so as to heat said first surface.

9. An apparatus according to claim 7 wherein said first heating element is disposed adjacent to said second surface so as to heat said second surface.

10. An apparatus according to claim 8 further comprising a second heating element disposed adjacent to said second surface so as to heat said second surface.

11. An apparatus according to claim 2 wherein said first and second surfaces are curved so that when placed together said first and second surfaces closely conform to one another.

12. An apparatus according to claim 11 wherein said curve includes an "S" curve.

13. An apparatus according to claim 2 wherein said first and second surfaces are flat.

*14. An apparatus for styling hair, comprising:*

*a handle pivotally operable between a first open position and a second closed position;*

*a first member and a second member disposed on said handle so that they are brought into mutual engagement when said handle is in said closed position;*

*a first source of dry heat in thermal contact with said first member so that in operation said first member is heated;*

*a first surface disposed on said first member;*

*a first two-dimensional array of a plurality of solid pins not all disposed in a line extending from said first surface;*

*a second source of dry heat in thermal contact with said second member so that in operation said second member is heated;*

*a second surface disposed on said second member; and*

*a second two-dimensional array of a plurality of apertures in said second surface, said apertures of said array oriented to receive corresponding pins from said array of pins without bending or distorting said pins.*

*15. The apparatus in accordance with claim 14, wherein said pins all have substantially a same sectional shape.*

*16. The apparatus in accordance with claim 15, wherein said pins have a circular sectional shape.*

*17. The apparatus in accordance with claim 15, wherein said apertures of said second array all have substantially a same sectional shape.*

*18. The apparatus in accordance with claim 17, wherein individual apertures of said second array are arranged to mate with individual corresponding pins of said first array.*

*19. The apparatus in accordance with claim 17, wherein said apertures have a circular sectional shape.*

*20. The apparatus in accordance with claim 14, further comprising:*

*a source of steam controlled by a trigger member attached to said handle, said source of steam emitting steam through holes in one of said first surface and said second surface in response to activation of said trigger.*

*21. The apparatus in accordance with claim 14, further comprising:*

*a source of steam emitting steam through holes in one of said first surface and said second surface.*

*22. The apparatus in accordance with claim 15, further comprising:*

*a source of steam controlled by a trigger member attached to said handle, said source of steam emitting steam through holes in one of said first surface and said second surface in response to activation of said trigger.*

*23. The apparatus in accordance with claim 15, further comprising:*

*a source of steam emitting steam through holes in one of said first surface and said second surface.*

*24. The apparatus in accordance with claim 16, further comprising:*

*a source of steam controlled by a trigger member attached to said handle, said source of steam emitting steam through holes in one of said first surface and said second surface in response to activation of said trigger.*

*25. The apparatus in accordance with claim 16, further comprising:*

*a source of steam emitting steam through holes in one of said first surface and said second surface.*

*26. The apparatus in accordance with claim 17, further comprising:*

*a source of steam controlled by a trigger member attached to said handle, said source of steam emitting steam through holes in one of said first surface and said second surface in response to activation of said trigger.*

*27. The apparatus in accordance with claim 17, further comprising:*

*a source of steam emitting steam through holes in one of said first surface and said second surface.*

*28. The apparatus in accordance with claim 18, further comprising:*

*a source of steam controlled by a trigger member attached to said handle, said source of steam emitting steam through holes in one of said first surface and said second surface in response to activation of said trigger.*

*29. The apparatus in accordance with claim 18, further comprising:*

*a source of steam emitting steam through holes in one of said first surface and said second surface.*

*30. The apparatus in accordance with claim 19, further comprising:*

*a source of steam controlled by a trigger member attached to said handle, said source of steam emitting steam through holes in one of said first surface and said second surface in response to activation of said trigger.*

*31. The apparatus in accordance with claim 19, further comprising:*

*a source of steam emitting steam through holes in one of said first surface and said second surface.*

*32. The apparatus in accordance with claim 20, wherein said holes include at least some of said apertures in said second surface.*

*33. The apparatus in accordance with claim 14, further comprising:*

*a housing within said handle extending from said second surface and having an internal cavity;*

*a refillable reservoir for containing fluid;*

*a vapor generator within said internal cavity of said housing, said vapor generator heating the fluid to vaporization;*

*a pump activated by a trigger attached to said handle, said pump withdrawing a metered volume of fluid from said reservoir and placing said metered volume of fluid in contact with said vapor generator; and*

*a passage connecting said vapor generator and at least some of said apertures in said second surface so that vaporized fluid passes from said at least some apertures.*

*34. The apparatus in accordance with claim 14, wherein said first and second surfaces are substantially flat.*

*35. The apparatus in accordance with claim 14, wherein said first and second surfaces are curved so that when said handle is in said closed position and said first and second surfaces are brought together said first and second surfaces closely conform to one another.*

*36. The apparatus in accordance with claim 35, wherein said curved first and second surfaces each include an "S" curve.*

*37. The apparatus in accordance with claim 20, wherein said first and second surfaces are substantially flat.*

*38. The apparatus in accordance with claim 20, wherein said first and second surfaces are curved so that when said handle is in said closed position and said first and second surfaces are brought together said first and second surfaces closely conform to one another.*

*39. The apparatus in accordance with claim 38, wherein said curved first and second surfaces each include an "S" curve.*

*40. The apparatus in accordance with claim 33, wherein said first and second surfaces are substantially flat.*

*41. The apparatus in accordance with claim 33, wherein said first and second surfaces are curved so that when said handle is in said closed position and said first and second surfaces are brought together said first and second surfaces closely conform to one another.*

*42. The apparatus in accordance with claim 41, wherein said curved first and second surfaces each include an "S" curve.*

*43. A method for styling hair, comprising:*

*placing the hair to be styled between a first heated element and a second heated element, the first heated element including a first surface having a first two-dimensional array of a plurality of solid pins not all disposed in a line extending therefrom, said pins of said first array all having substantially a same sectional shape, the second heated element including a second surface having a second a second two-dimensional array of apertures disposed therein, said apertures of said second array all having substantially a same sectional shape and oriented to receive corresponding pins from said first array of pins without bending or distorting said pins;*

*bringing said first heated and said second heated element into proximity with one another with the hair to be styled between said first heated element and said second heated element; and*

*pulling the hair to be styled out from between said first heated element and said second heated element so that the hair is pulled through the pins.*

*44. The method in accordance with claim 43, wherein said pins of said first array all have a substantially same sectional shape.*

*45. The method in accordance with claim 44, wherein said apertures of said second array all have a substantially same sectional shape.*

*46. The method in accordance with claim 45, wherein said sectional shape is circular.*

* * * * *